United States Patent
Hansen et al.

(10) Patent No.: US 9,807,135 B1
(45) Date of Patent: Oct. 31, 2017

(54) METHODS AND COMPUTING SYSTEMS FOR SHARING CLOUD FILES USING A SOCIAL NETWORK

(71) Applicant: Pear Software, LLC, Bountiful, UT (US)

(72) Inventors: Scott B. Hansen, Jupiter, FL (US); Andrew S. Hansen, Bountiful, UT (US)

( * ) Notice: Subject to any disclaimer, the term of this patent is extended or adjusted under 35 U.S.C. 154(b) by 130 days.

(21) Appl. No.: 14/788,747

(22) Filed: Jun. 30, 2015

Related U.S. Application Data

(62) Division of application No. 13/625,843, filed on Sep. 24, 2012, now Pat. No. 9,069,444.

(60) Provisional application No. 61/538,758, filed on Sep. 23, 2011.

(51) Int. Cl.

| | |
|---|---|
| *G06F 15/16* | (2006.01) |
| *H04L 29/06* | (2006.01) |
| *H04L 29/08* | (2006.01) |
| *G06F 3/0484* | (2013.01) |
| *G06F 3/0482* | (2013.01) |
| *G06Q 50/00* | (2012.01) |

(52) U.S. Cl.
CPC .......... *H04L 65/403* (2013.01); *G06F 3/0482* (2013.01); *G06F 3/04842* (2013.01); *H04L 67/06* (2013.01); *H04L 67/10* (2013.01); *G06Q 50/01* (2013.01)

(58) Field of Classification Search
CPC ....... H04L 65/403; H04L 67/06; H04L 67/10; G06F 3/0482; G06F 3/04842
USPC ......................................................... 709/203
See application file for complete search history.

(56) References Cited

U.S. PATENT DOCUMENTS

| | | | | |
|---|---|---|---|---|
| 2012/0054280 | A1* | 3/2012 | Shah | G06F 9/5072 |
| | | | | 709/205 |
| 2012/0166516 | A1* | 6/2012 | Simmons | H04L 67/1095 |
| | | | | 709/202 |
| 2013/0073671 | A1* | 3/2013 | Nagpal | H04W 76/023 |
| | | | | 709/217 |

* cited by examiner

*Primary Examiner* — Tu Nguyen
(74) *Attorney, Agent, or Firm* — Workman Nydegger

(57) ABSTRACT

A computing system for sharing a cloud data file using a social network is disclosed. The system includes a social network server and a cloud server. The cloud server syncs data files between a plurality of computing devices associated with cloud user accounts. The system also includes computer executable instructions that when executed perform the method including providing to a social network user a selectable link in the social network, the selectable link associated with a particular data file stored on at least two of the plurality of computing devices in the cloud network, wherein the particular data file is synced between the at least two computing devices by the cloud server; and upon selection of the link by the social network user, causing the particular data file to be transferred to an additional computing device.

16 Claims, 7 Drawing Sheets

METHODS AND COMPUTING SYSTEMS FOR SHARING CLOUD FILES USING A SOCIAL NETWORK

CROSS-REFERENCE TO RELATED APPLICATIONS

This Application is a divisional application of U.S. patent application Ser. No. 13/625,843, filed Sep. 24, 2012, titled "Synchronizing Large Files with a Cloud Network," which claims the benefit of U.S. Provisional Patent Application No. 61/538,758, filed Sep. 23, 2011, titled "Methods For Synchronizing Large Files With A Cloud Network." Both of the foregoing applications are hereby incorporated herein by reference in their entirety.

BACKGROUND

Cloud computing is a burgeoning method for storing computer data and running software applications using the Internet. Large servers, continually connected to the internet, store computer data and software applications. A device is allowed to connect to the server via an Internet connection, usually a web browser, and retrieve data or run software applications. This arrangement is valuable to small and mobile computing devices, which benefit from the large storage capacity and better computing power of a server.

The clear trend in cloud computing is to offload tasks normally performed on a local device to a Cloud server. It is anticipated that fast Internet connections will soon be ubiquitous and that the computation power and efficiency of cloud servers will strongly favor the use of server computers to store and compute data for local devices.

Recently, cloud storage has become a readily available cloud service (e.g., Dropbox, Google Docs, and Amazon Cloud Drive). Cloud storage allows a user to upload files to a server and disseminate the files to multiple devices based on a system of secure permissions allowing access to a centrally stored set of data. A file is created on a user's computer, the file is uploaded to a server, the server has instruction on where to send the file based on the users request and the file is pushed to all appropriate devices that are available on the internet for receiving the new file. Any device that modifies the file returns the modified file to the server via the internet and the server replaces the file on the devices that are connected to the server and have the appropriate permissions to receive the modified file. In this way a file can be duplicated on multiple computers and remain synchronized so long as there is an Internet connection.

DESCRIPTION OF DRAWINGS

Like reference numbers and designations in the various drawings indicate like elements. A cloud storage box is a graphical representation of data storage space operated by the cloud server.

DETAILED DESCRIPTION

I. Introduction

Figure 1:
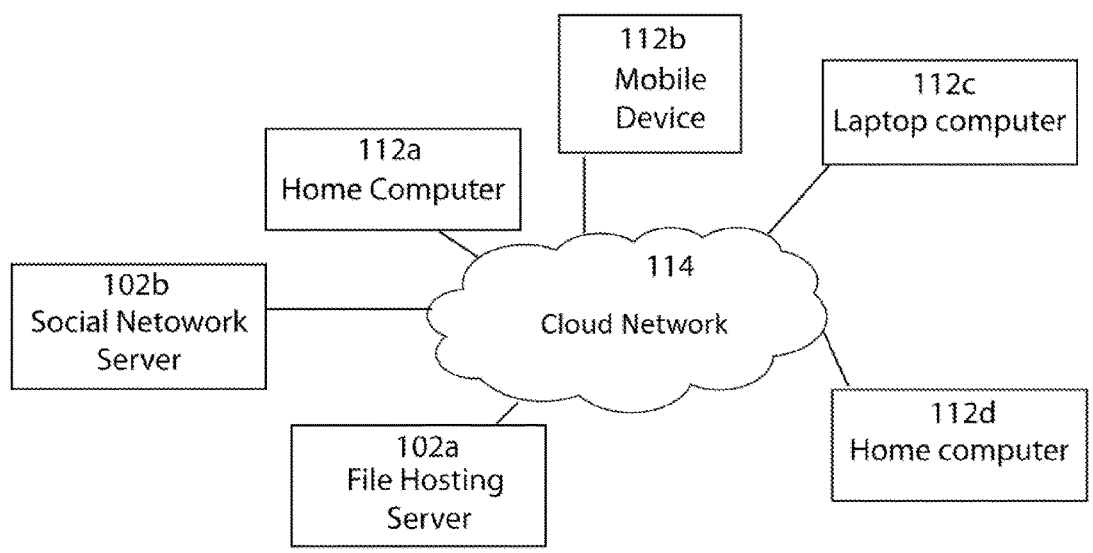
FIG. 1 illustrates a cloud server and a local computing device connected by a cloud network.

The present disclosure relates to methods and systems for providing cloud services to personal computing devices that store large personal files such as personal videos and personal photographs in a lossless format. The methods and systems include a cloud server that synchronizes large personal files in a lossless format between first and second local computing devices. The cloud server may also store the personal large files in a lossy format on the cloud server. The lossy file can be used to facilitate syncing of the lossless file between a first and second local computing device. The lossy file stored on the cloud can also be provided to a third local computing device having limited capabilities (e.g., a mobile device with a limited internet connection or limited screen resolution).

Users of cloud networks typically have personal large files such as video and high resolution photographs that take up vast quantities of storage space. Unlike music, the personal videos and photographs are likely to be highly unique. The present invention allows users to backup, share, and/or sync large personal files in a lossless format between two local computers with minimal burden on the cloud server storage. Syncing the lossless file between two local devices allows the cloud to store files in a lossy format with minimal risk of data loss.

In some embodiments, the cloud server can allow the user to selectively store some files on the cloud in a lossless format (e.g., small files such as word processing documents, emails, web pages, etc) and provide syncing in a lossless format of large files that cumulatively would exceed the available storage space if stored on the server permanently in a lossless format.

In one embodiment, the user can select which large files are stored in a lossless format in the cloud (i.e., maximum use of cloud storage space) and which files are merely linked between two local computing devices (minimal cloud storage space), and which files are stored in a lossy format. Alternatively the storage parameters can be set by a computer according to size (e.g., files above a certain size are stored in a lossless format on the server and files less than a certain size are stored in a lossless format in the cloud).

For purposes of this invention, a lossy file is "lossy" as compared to the original file from which the lossy is copied to the cloud server or second local computing device. (i.e., a file can be a lossless file if it is compressed in a lossy format on the first local computing device and then uploaded in the same format to the cloud network).

In the context of the invention, a "large" file is generally based on a percentage of available storage space relative to the number of desired files to store. Generally, a large file is one that is at least 0.1%, 1.0%, or 5% of the available free storage space or alternatively the total storage space or disc space either local space or cloud space.

II. Syncing Large Personal Files in a Cloud Network

FIG. 1 illustrates an example system 100 that stores personal photographs and videos on a cloud network with minimal burden on the cloud storage. System 100 includes a cloud network 114, a file hosting server 102a and a social network server 102b (collectively referred to herein as "cloud server" 102). The one or more cloud servers 102 are configured to interface with local computing devices through network 114. The cloud serves 102 are typically part of a server farm that stores and serves data to other computing devices on the network. The cloud servers may be part of a server farm dedicated to providing cloud services. Cloud server 102 is typically not a personal computer nor a mobile computer.

System 114 also includes a plurality of local computing devices. A local computing device can be a personal computer, tablet computer, mobile phone, iPad, iPhone, iTouch, etc. System 100 can include any number of the same or different local computing devices. As illustrated in FIG. 1, examples of specific local computing devices can be a home computer 112a or 112d, mobile device 112b, or laptop computer 112c (collectively referred to herein as local computing device 112). Local computing device 112 communicates with server 102 through network cloud 114.

Figure 2:
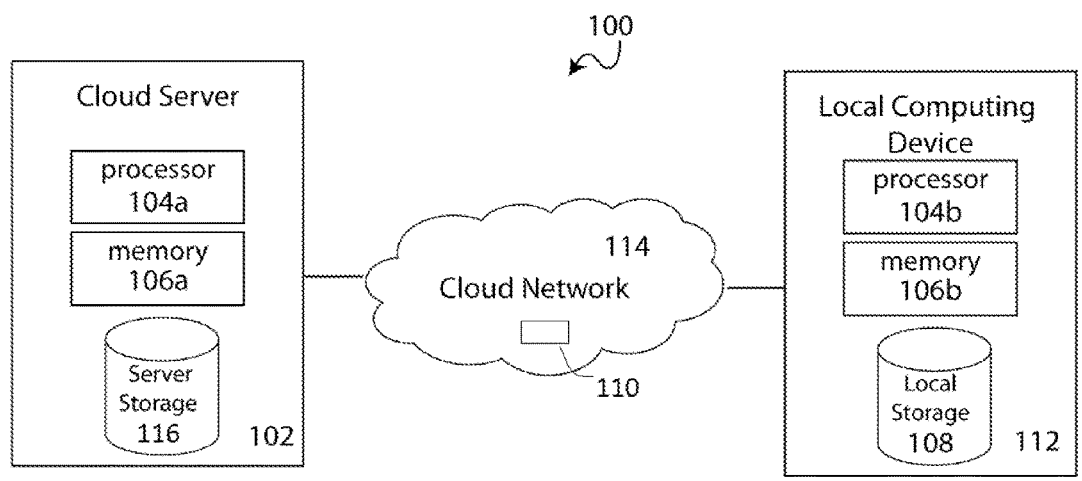
FIG. 2 illustrates multiple devices and severs connected through a network.

FIG. 2 illustrates cloud server 102 and local computing device 112 in more detail. Local computing device 112 has a processor 104b, memory 106b, and local storage 108. Server 102 includes a processor 104a, memory 106a, and sever storage 116.

Cloud server 102 may include a set of special purpose computers that have software that receives data from local computing device 112 and synchronizes data files stored on local storage 108 with server storage 116 on cloud server 102. Cloud network 114 includes hardware 110 that connects cloud server 102 with local computing device 112 through network switches, special purpose network computers, using network protocols such as html and TCP/IP. The server storage or local storage can be a hard drive or other computer readable medium.

System 100 includes a plurality of user accounts stored on one or more of the cloud servers 102 and/or local computing devices 112. The user account associates certain local computing devices 112 with each other and with personal data (including personal photographs and videos) stored in cloud server storage 116. The user account typically includes credentials, such as a username and password that allow the server computer to associate the certain computers and to ensure proper authorization for the association of the certain local computing devices and/or access to the personal data stored on the cloud server.

The users of the local computing device determine the association of local computing devices by establishing accounts and associating those accounts with local computing devices and providing personal data from any number of associated local computing devices and providing authorization to sync, backup, or forward personal data to other associated local computing devices. In a preferred embodiment the associations and credentials are stored on the local computing devices and server computers and the syncing, backing up, and/or forwarding of the personal data between local computing devices automatically occurs according to user-controlled criteria and when a network connection is available.

The one or more server computers 102 can associate any number of local computing devices into any number of groups. Typically the number of associated local computing devices in group will be orders of magnitude fewer than the number of groups serviced by the one or more cloud servers. For example, the number of groups of associated local computing devices may be greater than 10,000 or 1,000,000 and the number of associated computer within a group is typically less than 1,000 and may be fewer than 10 or as few as 3.

Typically an end user such as an individual owns and/or operates the local computing device and a cloud computing service provider owns and operates the cloud server.

Personal data refers to data that is generated by an individual and is made available on the cloud to authorized local computing devices and/or particular authorized users. Personal data may include personal photos and personal videos.

Figure 3:
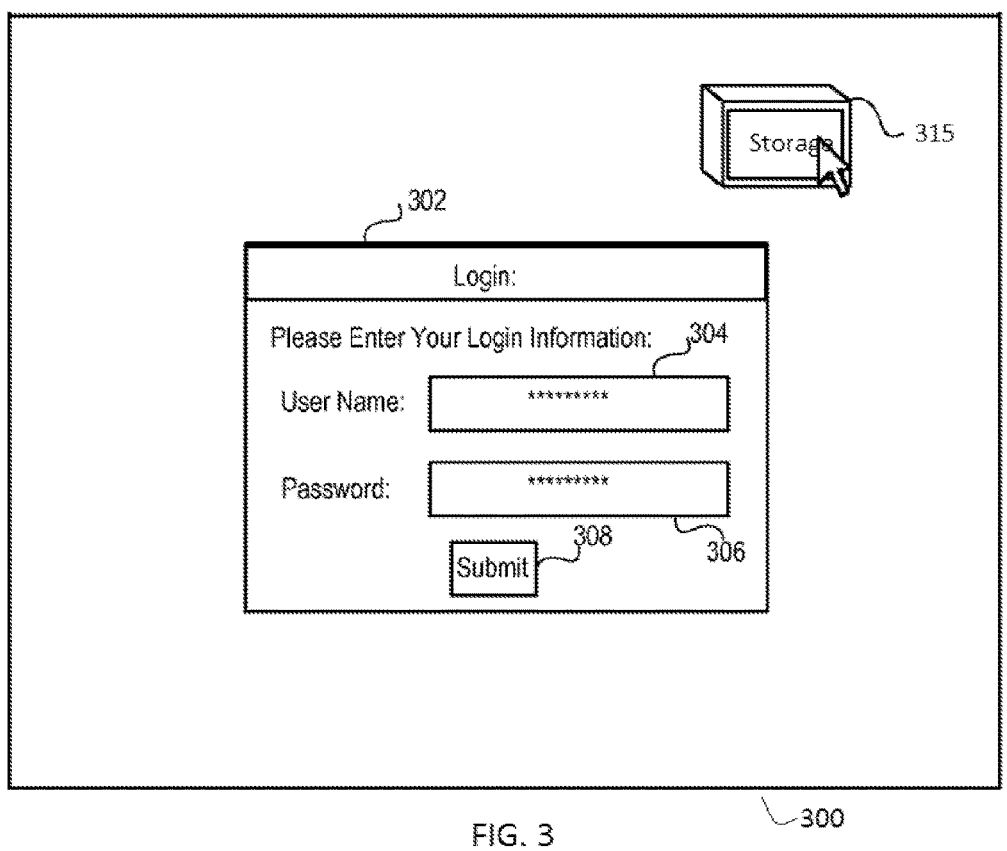
FIG. 3 illustrates a graphical user interface (GUI) for providing a user name and password to a cloud server.

FIG. 3 illustrates an example login screen for associating a first local computing device (e.g. 112a) to a storage device of a cloud server (e.g. server 102a). The user interface 300 includes input boxes 304 and 306 and a storage folder icon 315.

The storage folder icon 315 represents a storage space in the cloud that is associated with a particular account and/or local computing devices. The user may request access to the storage folder by double-clicking on the storage folder icon 315. In response to the selection, the computer presents login window 302 in the user interface through which the user can verify his or her identity. The login window 302 prompts the user for a user name and password. The user enters his or her user name and password into the boxes 304 and 306, and selects the submit button 308 to indicate that his entry is complete. The system then verifies the user's identity using the user name and password (e.g., by matching the user name and password against a stored group of valid user names and passwords).

If the user's identity is verified, the system may grant access to the user's account and associated storage space located on a cloud server. The user performs a similar verification on a second local computing device, linking the two devices to the same account. The user sends a request to the server to store a file located on the first computing device. The cloud server receives the request from the first local computing device and transfers the file to the second local computing device. In the simplest implementation the file is stored and accessed using a standard file format and graphical user interface (GUI) provided by the operating system e.g. NTSF and Explorer in Windows 7 or HSF and Finder in Mac OS X. In another implementations the file is accessed by a GUI provided by a software program running on the local computing device. The file can be transferred from the first local computing device to the second local computing device in a lossless format. The lossless transfer can be a direct transmission from the first local computing device to the second local computing device or the file can be transferred in the lossless format to the cloud server where it is only temporarily stored and then deleted or compressed while the other two lossless copies remain on the first and second computing devices.

With reference again to FIG. 2, local computing device 112a is a home computer. File hosting server 102a receives a request from home computer 112a to access a user account and upload a file stored on home computer 112a. Sever 102a receives at the cloud server the file. Server 102a receives instructions for distributing the uploaded files to a second local computing device (e.g. laptop computer 112c) and transfers a copy of the file to the second local computing device. In one implementation the location and filename for the file is stored on cloud server (e.g. server storage 116). In a second implementation the location and filename is stored on home computer local storage device 108 and then stored in cloud memory 106a for executing the function on the server.

In addition to storing syncing the file in the lossless format between two or more local computing devices, the file can be compressed using a lossy formatting engine, which reduces the size of a file by converting the lossless format to a lossy format. The lossless format typically uses compression or other methods known in the art to reduce the file size.

The stored filename and file location may be maintained in a relational database that associates the lossless file and lossy file. The relational database can also include file statistics (date created, size, format), permissions, and user defined properties (e.g. a documents importance or desired accessibility). The database can also include previous versions of the file. The database can be stored on a cloud server, on a local device, or on a combination of the server and a local computing device.

Figure 4:
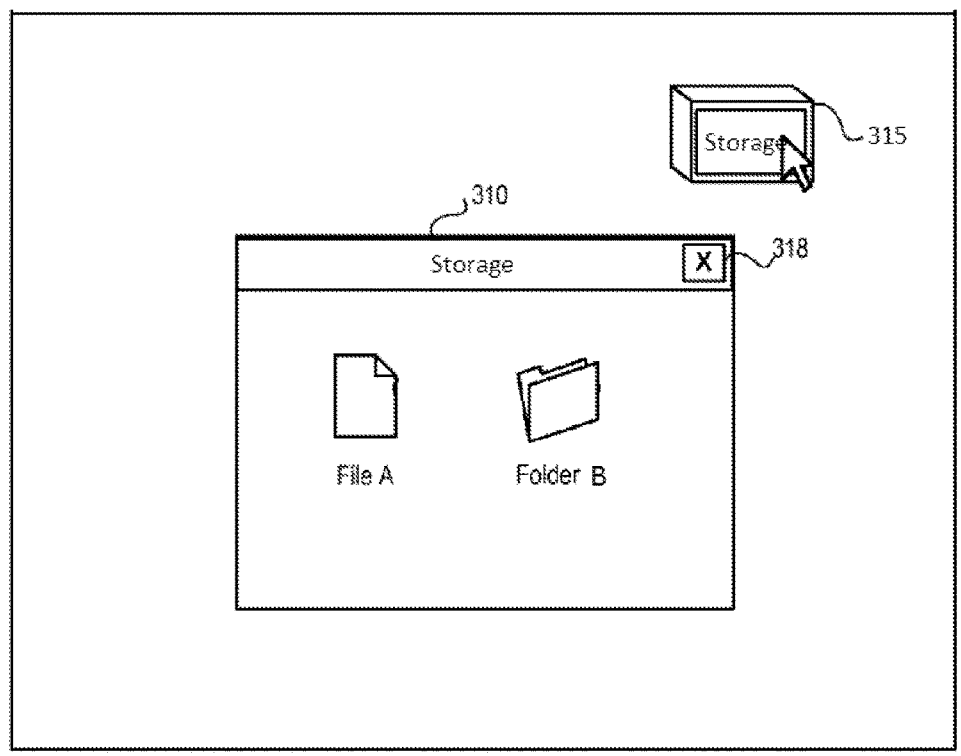
FIG. 4 illustrates a GUI for displaying folders and files located on a cloud server.

In FIG. 4 storage window 310 is a graphical representation of storage space located on cloud server 102a. Files are transferred from local device 112a to server 102a using cloud network 114. Server 102a receives a request from device 112a to receive File A 314; server 102a receives File A, and stores File A in server storage 116. Likewise folder B 316 is stored in server storage 116. Storage folder window 310 presents representations of any files or folders the user has added to his or her storage folder (e.g., file representation 314 for File A) and folders (e.g., file representation 316 for Folder B). Each folder can include multiple files or a nested hierarchy of folders and files. Each file representation can be an icon, an alphanumeric file identifier such as the file name, or any other visual representation of a file or folder.

The user can navigate through the folders presented in the storage folder window 310 much as the user would navigate through folders presented in a navigational window (e.g., by clicking on a folder representation to view its contents). In some implementations, the storage folder window 310 is graphically connected to the storage folder icon.

A user opens a file represented in the storage folder window 310 by clicking on the corresponding file representation. For example, a user can open File A by clicking on the file representation 314 for File A. The computer will then open the file and display the contents to the user. In some implementations, a user can also hover a cursor over a file or folder to be presented with a hover window that displays information about the file or folder (e.g., date last modified, contents of a folder, location of a lossless format, location of a lossy format, a thumbnail view of the first page of a file, preference policy settings for the file or folder, etc.).

On a second local computing device 112d a storage window 310 is displayed after verifying the user's username and password and associating the username and password with device 112d or a portion thereof. A copy of File A is stored on the second local computing device 112d by clicking on File A in storage folder 310 and dragging File A to local device 112d. The storage program 315 accesses File A and copies File A to the desktop. In some implementations a user can hover a cursor over the copied file or folder to be presented with a hover window displays information about the file or folder including permission. In some implementations files and folders can be copied or synchronized manually by dragging and dropping folders or automatically according to stored permissions. In a preferred embodiment files are automatically pushed from a first local computing device to a second local computing device according to established rules or instructions associated with a user account.

The present invention also relates to a method carried out on a cloud server for a plurality of user accounts. Each of at least a portion of the user accounts are associated with at least a first and second local computing device. For each of the plurality of user accounts the method includes syncing a file in a lossless format between the first and second local computing devices and receiving at the cloud server a request from a third local computing device for the file in a lossy format. The third local computing device has (i) a lower screen resolution, (ii) a smaller storage space, or (iii) a slower network connection speed as compared to the first or the second local computing devices.

A user indicates that files or folders should be added to the cloud storage folder by dragging and dropping file representations of the files or folders onto the storage folder icon 315. Dragging a file representation of a folder indicates that the folder, and all of its contents, should be added to the storage folder.

Figure 5:
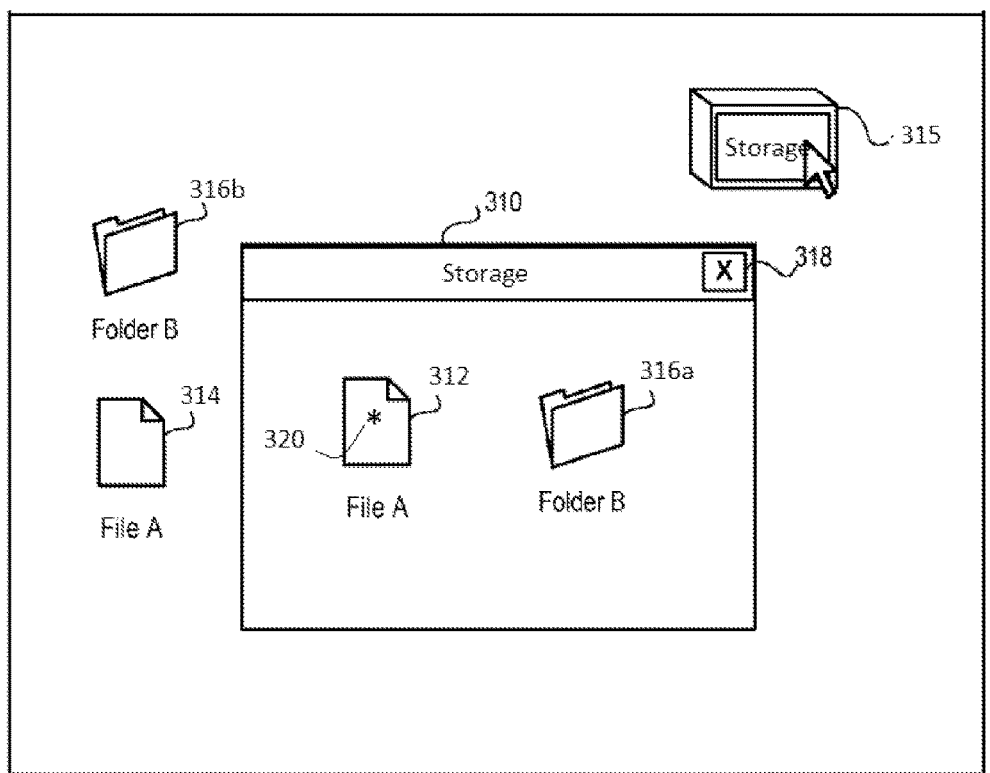
FIG. 5 illustrates a GUI for displaying a lossy file.

FIG. 5 illustrates example available user actions for dragging-and-dropping the file representation 314 for File A onto the storage folder icon 310 and storing the file in a lossy format. As shown in FIG. 5, a user selects (e.g., with a mouse or other input device, such as a finger on a multi-touch screen, or stylus on a touch screen) the file representation 314 of File A and drags the representation to the icon of the storage folder 310. When the user drops the file representation 314 onto the storage folder icon 300 (e.g., by releasing the mouse), the computer provides File A to an underlying storage folder program. The storage folder program sends File A to a cloud server and/or a second local computing device.

In some implementations, when a user drops the file representation onto the storage folder icon 310, the user is presented with a preferences screen that allows the user to specify various preferences for the file. For example, the preferences screen can allow a user to specify one or more of permissions for the file (e.g., can the file be modified or just viewed, can the file be replaced with a lossy version of the file if a lossless version is stored elsewhere, how many copies of the file should be made, a storage preference policy indicating where copies should be stored, and whether the file should be encrypted. The preference screen can also allow a user to specify an importance level of the file (e.g., according to a rating scale). This importance level can be mapped to other preference values, such as how many copies of the file should be made and whether the file should be encrypted (e.g., important files should encrypted, and the more important the file is, the more copies should be made).

In some implementation the user preference requests that File A is stored in storage folder 310 in a lossy format. Icon File A 312 represents File A stored in a lossy format in storage folder 310. Symbol 320 alerts the user that File A is stored a lossy format. Symbol 320 can be an asterisk, color, action (e.g. flashing folder icon), altered transparency or other symbol that indicates to the user that a file is lossy.

While FIG. 5 illustrates icons for available dragging and dropping features the file representation can be dragged from other interfaces, for example, in a folder open in the interface 100, or in an application (e.g., a backup application) open in the interface 300. Also, the techniques used for creating a file can also be used to make a new folder.

By providing a user name and password, the users can associate a local device, file, or folder with a user account. Versions of the same file linked to similar files stored on local computers or the cloud can be synced using permissions established with the username and password. In some implementations, a permission is synchronizing file A with related versions associated according to rules stored in the cloud or local computing device.

Figure 6:
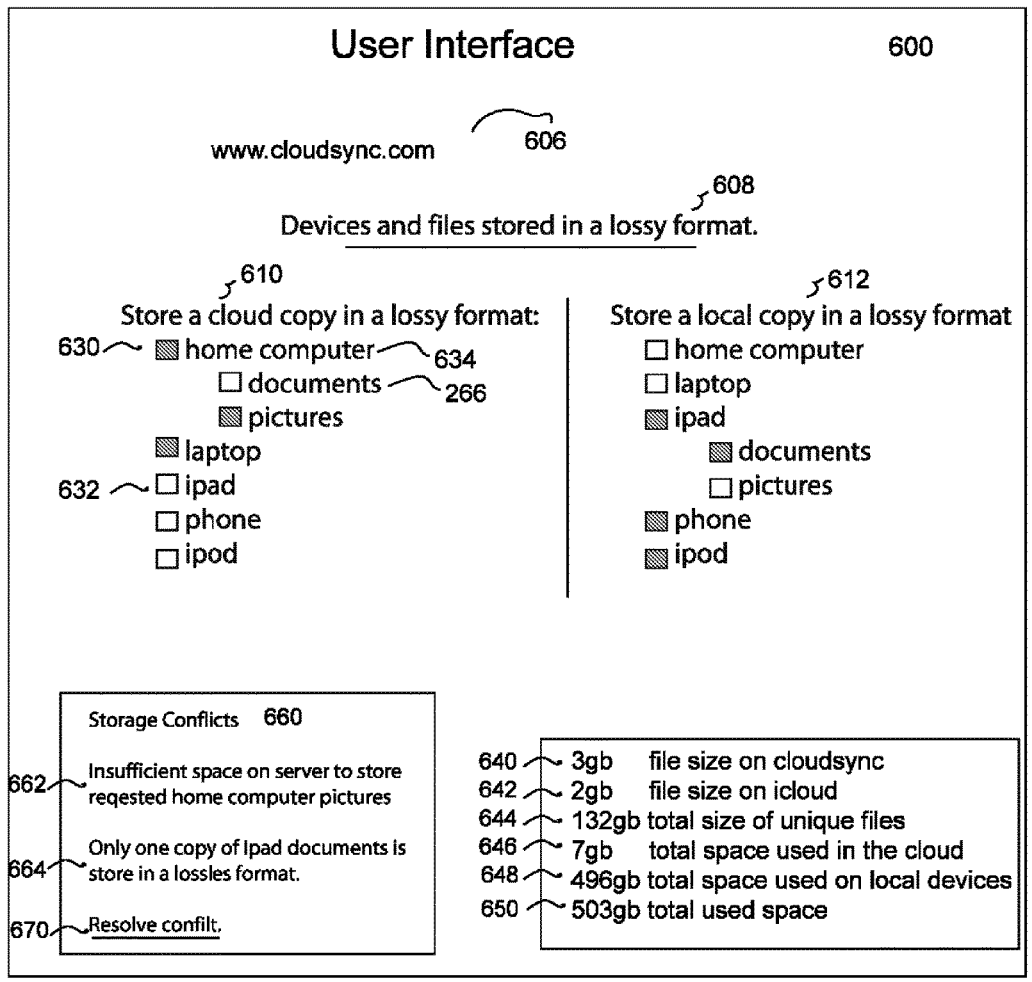
FIG. 6 User interface for selecting a lossy file.

FIG. 6 illustrates example user interface 600. A users is provided selectable icons 630 (selected) and 632 (unselected) for storing a file in a lossy format in the cloud (610) or locally (612). The interface is located at web address 606.

In other implementations, user interface 606 can be a program saved locally. Example user interface 600 provides the user with information about his or her storage space and (640-650). Storage conflict 660 displays conflicts 662 and 664 and provides a selectable link 670 to resolve storage conflicts among files.

Figure 7:
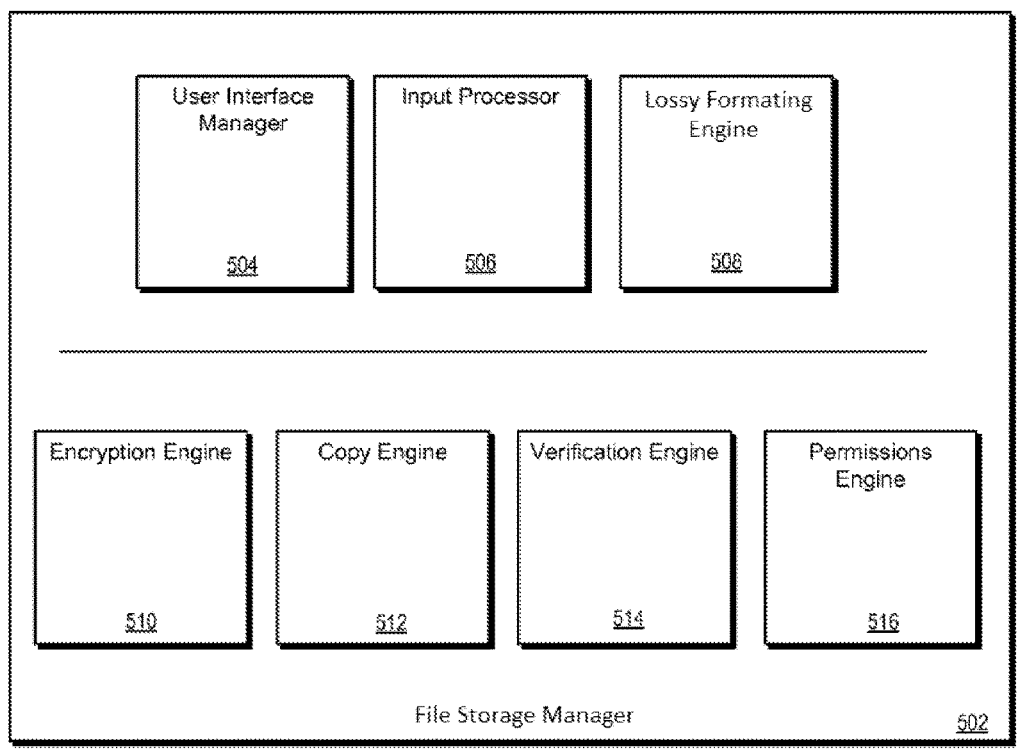
FIG. 7 illustrates an example architecture for a storage folder manager.

Files are managed with a storage folder manager. In general, the storage folder manager, 502 as shown in FIG. 7, includes user interface manager, input processor 506, lossy formatting engine 508, encryption engine 510, copy engine 512, verification engine 514, and permissions engine 516. These components can be communicatively coupled to one or more of each other. Though the components identified above are described as being separate or distinct, two or more of the components may be combined in a single process or routine. The functional description provided herein including separation of responsibility for distinct functions is by way of example. Other groupings or other divisions of functional responsibilities can be made as necessary or in accordance with design preferences.

The input processor receives input from a user and processes the input appropriately (e.g., by providing the input to the storage folder program or another program responsible for handling the input). In general, the input processor 506 processes input indicating that one or more files or folders are being dragged to the storage folder, processes input indicating that the storage folder should be opened, processes input that a user's identity should be verified, and processes input that a particular file or folder should be stored in the cloud.

In some instances the amount of space on serve storage 116 or local storage 108 is insufficient. Compression techniques can be employed to reduce the size of a file in a lossy format. The compression may include a different type of file format (e.g., mpeg to mp4) or the compression may be a smaller file size of the same file format (e.g., jpeg to jpeg). As mentioned above for purposes of this invention, "lossy" and "lossless" are determined in reference to a change in the file as between a file as stored on the first local computing device and the cloud or a second local computing device connected to the cloud network.

A lossy format lacks information of the original file while maintaining the intended use of the file. For example a 5 megabyte photograph can be compressed to 1 megabyte using a lossy algorithm. The compressed file may have a size greater than 10, 50, 100, 250 or 500 kilobytes and less than 10, 5, 1, or 0.5 megabytes or within a range of these upper and lower sizes. In a preferred embodiment, the file in the lossless format has a size greater than 0.5, 1.0, 5, or 10 megabytes and less than 100, 50, or 10 megabytes or within a range thereof. Typically a small photograph with one large object can be useful at a 10 kb file size. In some instances the intended purpose of the photograph is to display small or intricate images; in which case at least a 100 kb photograph is desired. More preferably a lossy format is 500 kb or more preferably 1000 kb. Often the usefulness of an image at low resolution is subjective to the purposes of the user. For example, a photograph that is intended to be edited and/or used for prints must be much larger (e.g., greater than 1.0 megabytes) than a thumbnail. A thumbnail is yet another technique for compression. A file saved in a thumbnail format is distinguished from a lossy format in that the intended propose of the original file is lost in the thumbnail format. Often a thumbnail format is used to help a user locate a file. For example a thumbnail of a video file may be used to identify the video, but lacks sufficient information to provide the intended usefulness of the original file. A thumbnail image of a photograph or of the first page of a pdf are similar in scope to a thumbnail of a video file.

A lossy compression is distinct from a lossless compression in that data or information is unrecoverable in the lossy format. This is in contrast to lossless formats such as zip and gzip which can be uncompressed with no data loss. Typically lossless compression is very limited in its ability to reduce file sizes.

Lossy formatting engine 508 decreases the size of a file. For example a picture image that is 4 megabyte can be decreased in resolution to a file size of 100 kb and stored on the cloud server. The lossy formatting engine utilizes an algorithm for when and which. An algorithm is provided to determine select files for compression in a lossy. The lossy formatting engine uses an algorithm to determine In some implementations, the lossy formatting engine decides indicating that the storage folder window should be closed (e.g., a user clicking on a close button on the storage folder window or using one or more keyboard inputs to indicate that the window should be closed). In other implementations, the timeout monitor tracks how long the storage folder window has been open and closes it after a preset time (e.g., a time period specified by a user in a preference setting, or a hard-coded period of time). The time can be hardcoded into the timeout monitor 508 or can be changed, for example, in response to a user specifying a desired time for the storage folder window to stay open (e.g., by setting preferences for the storage folder window). In other implementations, the timeout monitor monitors for user presence at or near the computer, and determines that the storage folder should be closed when the user is no longer present. For example, the timeout monitor 508 can monitor when the user enters input to the computer (e.g., types characters on a keyboard, clicks with a mouse device, or speaks into a microphone) and if a given period goes by with no input, the timeout monitor can determine that the storage folder should be closed. The given time can be hardwired into the timeout monitor or determined, for example, from a user-specified preference. As another example, the timeout monitor 508 can monitor whether the user is physically present at the computer, for example, by monitoring whether signals such as radio frequency (e.g., Bluetooth™) signals received from a device associated with the user (e.g., a badge or cell phone) are being received. As yet another example, the timeout monitor can use an identification of the user present at the computer (e.g., biometric data used to do face identification) to determine whether the user using the computer is still the authorized user. When the timeout monitor 508 detects that the authorized user is no longer physically present, the monitor 508 can immediately close the storage folder window, or close it after a predetermined period of time (e.g., a period of time specified by a user in a preference setting, or a hard coded period of time). In other implementations, the timeout monitor 508 closes the safe deposit window then the power state of the computer changes. Examples of changed power states include, but are not limited to a screen saver, display sleep, sleep, shutdown, or hibernate). In still other implementations, the timeout monitor 508 determines that the storage folder window should be closed as soon a user indicates that the window should be closed, a sufficient amount of time has passed, the power state of the computer changes, or the authorized user is no longer present.

The encryption engine 510 encrypts files (and optionally copies of files), for example, using standard encryption algorithms. In some implementations, the encryption engine 510 also encrypts backup versions of the files. The encryption engine identifies the backup version of a file The copy engine 512 determines how many copies of a file are needed, determines where each copy should be stored, makes the copy and stores the copy in the correct location. In general, the copy engine can store copies on local storage, external storage (e.g. usb drive), or cloud server storage. The copy engine optionally maintains data indicating where each copy of a given file is stored, e.g., in a database that associates files with links to copies of the file. This data can be used, for example, when the file is deleted to ensure that all copies of the file are also removed, or to identify a copy of the file to use as the file when the primary storage for the file fails.

The copy engine 512 can apply various algorithms to determine where a file should be stored and how many copies. The number of copies is important for backing up a file and the location of the file is important for file availability. Sometimes a server is unavailable due to malfunction, or slow due to over use. Storing a file on multiple local devices that are available to the cloud network increases the likelihood that a file is rapidly accessible. In the case where only a lossy format is stored on the cloud server, then the local computing device serves as the sole source of the lossless file. In a preferred embodiment, the algorithms determines the availability of a local devices and store the file based on the probability that the file is available to the cloud network line. In some implementations, the copy engine 512 always stores the file in a predetermined location. The location can be hardwired into the copy engine or determined from a user preference setting, e.g. copy a file to all local devices associated with the account. In other implementations, the copy engine 512 determines the location on a file-by-file basis. In some implementations, the location is determined from user preferences for a particular file (e.g., user preferences specifying the location desired for that file, an importance level of the file that the copy engine 512 translates into a desired location, or input according to user interface 600 shown in FIG. 6).

In other implementations, the number is determined based on how much free space is available for storage on the one or more storage devices available to the user. For example, the copy engine 512 can determine a maximum number of locations available and calculate the maximum availability of all files based on space and accessibility of the location to the cloud network. The availability of a local device can be determined by device history or device type.

In some implementations, the copy engine 512 has a minimum number of storage location (e.g., a default number or a number received from user preferences), but makes additional copies, for example, by making the maximum number of copies as described above. In these implementations, the copy engine 512 can optionally flag a number of copies exceeding the minimum number. When the copy engine 512 needs to store copies of a different file, but does not have enough storage space available, the copy engine can delete the flagged copies to create additional storage space. In some implementations, the copy engine 512 selects which flagged copies to delete based on their physical location in storage. For example, the copy engine can select copies to delete so that the file is optimally available online. As another example, the copy engine can select copies to delete so that the remaining copies are distributed across the maximum number of devices.

The copy engine 512 determines where to store each copy and the format according to one or more storage preference policies. In general, the copy engine 512 has a default preference policy to store a lossless file on all user-specified local devices. In some implementations, the preference policy specifies different preferred file types based on the type of local device, e.g., laptop, iPod, iPad, or desktop computer. In some implementations, the preference policy considers how frequently a file is accessed. For example, if a file is accessed more frequently, it can be identified as an "important" file to the user, and the lossless format can be stored on the cloud server and/or on multiple local devices for maximum security and availability.

The verification engine 514 verifies a user's identity (e.g., before the storage folder window is shown to the user). In some implementations, the verification engine 514 verifies a user's identity by receiving a user name and password and comparing them to a stored user name and password (e.g., as described above with reference to FIG. 3). Other verification techniques are possible, for example, the verification engine 514 can verify a password or passphrase provided by the user by comparing it to a stored password or passphrase, verify a token associated with the user (e.g., a token associated with a USB device inserted into the computer, or a token associated with a device that is within wireless range of the computer—for example, connected to the computer over Bluetooth), authenticate an identity of a mobile device associated with a user (e.g., by authenticating that radio frequency signals, such as Bluetooth™, received from a device in the vicinity of the computer are from a device associated with the user), verify that a user has logged onto specified networks (wireless, Ethernet, virtual private networks, etc.), or verify biometric data received from a user (e.g., by using face recognition techniques, verifying a user's fingerprint, verifying a user's voice, or verifying a retinal scan of the user). In some implementations, a combination of multiple verification techniques are used. Using multiple verification techniques can lead to greater security for the files and folders stored in the storage folder. In some implementations, access is only allowed during certain times (e.g., certain hours of the day or certain days of the week).

The permissions engine 516 determines permissions associated with a particular file and allows a user only the appropriate access to the file. For example, the permissions engine 516 can determine whether a user should be allowed access to a file based off of permission in a social network. As another example, the permissions can include whether a file can be copied or transferred from specified local devices or cloud servers. The permissions can be specified, for example, by a user at the time the user adds the file (or a folder containing the file) to the storage folder, or at a later time. Or the permissions can be specified as defined by relationships in a social network.

As described above with reference to FIGS. 3-5, each file representation corresponds to a file stored on a storage device. The system receives input dragging-and-dropping a file representation onto the storage folder (604), for example, as described above with reference to FIG. 5. The file representation can be, for example, a representation of a file or a representation of a folder storing one or more files or other folders. The system makes one or more copies of the file corresponding to the file representation (606). In some implementations, the file representation is a representation of a folder, and the system copies (and optionally encrypts) each file included in the folder. In some implementations, the system stores each of the copies on a storage device selected from a number of available (i.e., accessible by the system) storage devices. The storage device for each copy can be selected based on a preferred order of the storage devices and an available capacity of the storage devices.

In some implementations, the system additionally encrypts the file and each of the one or more copies of the file. The system may also identify past versions of the file FIG. 7 is a flow diagram of example process 700 for adding a file to a storage folder and allowing a user access to the file through the storage folder. For convenience, the example process 700 will be described in reference to a system that performs the process 700. The system can be, for example, the storage folder manager 502.

The system receives input dragging-and-dropping a file representation onto a storage folder icon and encrypts a file corresponding to the file representation (702). In some implementations, the system additionally creates one or more copies of the file and encrypts each copy. In some implementations, the file representation is a representation of a folder, and the system encrypts (and optionally copies) each file included in the folder. The system receives input from a user selecting the storage folder icon (704), and verifies the identity of the user, for example, as described above. The system displays a storage folder window including a representation of the file (706), for example, as described above. The system receives input selecting the representation and allows the user access to the file (708). Providing access can include decrypting the file, if necessary, and providing appropriate access permissions to the file. In some implementations, when the original copy of the file is no longer available (e.g., because of a disk failure of the storage device storing the file), a copy of the file is provided to the user instead. In some implementations, when the user modifies the file, any copies of the file are also updated to reflect the user's modifications. The copies of the file can be identified, for example, from the data maintained by the copy engine, for example, as described above. These steps can be performed by a native file system that is part of an operating system (e.g., Mac OS X, Windows, or Linux).

The present invention also relates to social networks that can include one or more of the syncing and backup features described herein. In one embodiment, the accounts that provide syncing between first and second local devices are social network accounts and include rules and authorizations for uploading social network data such as photographs or videos and provide access to a friend network that has been established between users. In one implementation, electronic tags (e.g., names of people or places) associated with individuals or items in the photographs can be synced and/or backed up between first and second local computing devices via a social network server or other cloud server. The social network server may sync or backup a file in a lossless format on both the first and second computing devices and then store the file in the compressed format for access on the world wide web.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be coupled by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. For example, modules 404, 406, 408, 410, 412, 414, and 416 need not perform all, or any, of the functionality attributed to that module in the implementations described above, and all or part of the functionality attributed to one module may be performed by another module, another additional module, or not performed at all. Accordingly, other implementations are within the scope of the following claims.

In some implementations, the storage folder program takes various actions to further secure the file from one, or both, of two main dangers: someone without authorization accessing the file, and a physical loss of the file due to failure of a storage device storing the file. To protect against someone without authorization accessing the file, the storage folder program can encrypt the file (e.g., using standard encryption techniques), obfuscate the file name (e.g., by renaming the file with an alphanumeric phrase that the storage folder associates with the old file name), or take other actions. In some implementations, the storage folder program copies the file to a secure location and deletes or securely deletes the original version of the file. Secure deletion is performed, for example, by overwriting the file with alternating patterns of data that make it difficult to recover the file. An example standard for secure deletion is the U.S. Department of Defense standard 5220.22-M.

To protect against physical loss of the file, the storage folder program can make one or more copies of the file and store them in different places in local storage on the local computing device or in external or remote storage accessible to the local computing device.

In some implementations, the cloud server 112 further includes a backup component that stores backups of data received from the local computing device on server storage 114 or remotely on one or more of the local storage 108. In general, the backup component monitors data on the local computing device to detect when files, or other data (e.g., items, information portions, directories, images, system parameters, playlists, address books, e-mails, e-mail folders, application states, preferences, etc.) have been changed. For example, the backup component can run as a background component on the local computing device that is constantly monitoring for data changes, or the backup component can be invoked whenever data is modified. In some implementations, the backup component can distinguish between a substantive change (e.g., text within a document being modified) and non-substantive changes (e.g., changes that cancel each other out).

In another implementation, the local computing device 112 includes the backup component that stores backups of data from the local computing device on one or more of the local storage 108, external storage (e.g. attached hard drive), and remotely to a cloud server (e.g. storage server 114).

The backup component stores the versions of each file in a backup database that associates each version with previous versions. In some implementations, the backup component stores a complete lossless copy of each file and any subsequent versions of the file. In other implementations, one copy of the original file is stored. When one or more subsequent versions are generated through subsequent backup operations, the backup data contains only the differences between the current version and a past version, thereby saving storage space. The backup data can be compressed and/or encrypted, for example using standard lossless compression techniques (e.g., the ZIP file format) and standard encryption techniques (e.g., the RSA algorithm for public key encryption). Other lossless compression techniques or encryption techniques can also be used. For yet more saving of storage space the file can be compressed in a lossy format (e.g. reduced resolution). Multiple backups can combine a lossy backup with a lossless backup. The backup component also tracks where the backup data for each file is stored, and may optionally handle removing older or otherwise unnecessary backup data at an appropriate time.

The invention allows for an advertisement to be uploaded onto a local computing device and then displayed on the local computing device or accessed from the local computing device. Storing an advertisement on a local device may be advantageous when a large advertisement such as a video file is associated with cloud server data. Portable electron devices such as iPods, tablets, and smart phones often have two or more radios for transferring data (e.g., WiFi radio and 3g radio). These different radios often have different data transfer rates. In some instances the data transfer has a per megabyte cost when transferred over one radio (e.g., cell phone data transfer) and may be free or less costly when transferred over another network (e.g., WiFi). In the present invention, the cloud server may upload and store an advertisement on a local device using a first connection (e.g. WiFi) and then receive a search result over a second radio and associate the advertisement with the stored advertisement. This allows the advertisement to be transferred when a favorable connection is available. A user account established for storing or syncing files on a local computing devise using a cloud network can also be used for storing the advertisement. The advertisement may directly relate to data associated with the user through an established user account associated with or available to the cloud server. Permission to store an advertisement on the local computing device is associated with a user account. For example a user establishes a relationship between a cloud server 102 and a local computing device 112 using a user name and password. The cloud server uploads an advertisement to local computing device 112. The advertisement is displayed to the user by accessing the advertisement on the local machine.

In another embodiment, The invention further provides a method for the use of two or more online cloud storage services in a single user interface or single user experience. For example, a user with 3 GB of storage space in dropbox and 5 GB of iCloud space has a total of 8 GB of total cloud storage space. However, a first service provider may not know the files of a user stored on a second service providers server. However, the user may want his or her files to appear as though they are store in a single storage place on his or her local device and in the cloud. A user interface is provided to present files on a local hard drive in a hierarchy that is independent from a file hierarchy stored in the cloud. This is termed the "unified file software interface" The multiple cloud servers can have different user names and login credentials. The user interface can verify the access rights to the two or more servers by requesting verification of the individual servers. By logging into more than one server the software has access to multiple file systems and can present them as a single file system to the user. Alternatively the user can login to each service provider and provide the user credentials through the cloud provider's software. The system then can access the files through the local system. This has a disadvantage that a user on multiple local devices must then login to each service provider independently. The unified software interface can also provide access to the unified file hierarchy in the cloud, this feature is called the unified file cloud server. In the unified file cloud server the organization of the files on the local drive can be presented in the cloud with the same hierarchy as found the local drive. The files can be accessed through a link in the cloud to the other cloud servers. In one embodiment the unified file cloud server creates a file on the unified cloud server that access the cloud storage space in a cloud storage provider. The unified cloud server does not necessarily need to provide cloud storage space but only link cloud files. The program can store transfer a file to a particular cloud storage space In an alternative approach the hierarchy found on the local device can be replicated in the cloud by duplicating a folder system where select folder are empty or the files in the folders are in a lossy format. The lossy format could be a description of where the lossless file is stored in the cloud. The software program can also place an empty file on a cloud server to provide a cloud server experience that replicates the hierarchy on the local device. Server space is provided where a user logs into a cloud server that connects to another cloud service provider. In this way a cloud user interface links to two cloud storage service provides in the cloud.

In a simple example, a folder on a local device is provided and a folder for each of more than one cloud storage spaces is placed into the folder on the local device. For example a folder named "my documents" could be provided on a local device; a Dropbox folder and an iCloud folder are each placed in the local folder. When file (e.g. word document or picture) is placed into the folder on the local device the software program copies the file to one of the two folders for storing a file in the cloud (e.g. Dropbox or iCloud). The local folder can be marked so that the user knows that the files will be stored in the cloud. This could be an icon, graphic, words, sound or animation, vibration, or communication that helps the user know that the folder is used for storing a file in the cloud.

In an embodiment of the invention, the local storage of synced files may be on removable data storage. The removable storage may be an SD card. The local storage allows the user to switch devices and retain the local files without syncing. The removable disc may have a tag, account information, or other computer readable instructions that identify the removable device and/or its contents such that other device that receives the removable storage device can be recognized as a network computer and/or a local storage disc that is associated with the cloud network. The proper syncing of content to the cloud or other local devices can be achieved.

Another embodiment of the invention relates to automatically transferred social network content to a local device (whether in a lossless or lossy format or whether stored on the cloud server). By "pushing" the social network to a local device, additional copies of the content are created, thereby providing backup protection and providing convenient local storage for fast access by the recipient of the pushed social media content. In this case, an algorithm may be used to determine who is likely to look at the content and the "push" is limited to client's that (i) have authorized access to the content and/or (ii) for client's that are predicted to look at the content and/or want a lossless version of the pushed content.

In one embodiment, the pushed content is determined using user history such as looks, wall posts, common fiends, email messages, social network relationships (e.g., friends or family), similar likes, dislikes, profile preferences, or the like or other social network or profile information associated with the source of the pushed content or the potential recipient of the pushed content. In one embodiment, the push occurs when the recipient client device is connected to a particular network or type of network and/or based on the size or type of content being pushed. For example, if the client device has access to a WiFi network or a network with a particular speed or unlimited data transmission, large files may be automatically pushed to the client, whereas if the device is connected to a limited network data system such as a cell phone connection, the push may not occur or may be limited to pushing data of a particular size.

In one embodiment, the user may be able to select the storage space of pushed content and/or view the amount of storage space used for pushed content. In another embodiment, an advertisement is pushed to a local device. The advertisement can be a large file such as a video. The advertisement may be selected based on user profiling or historical data, e.g. keyword search or a visit to a web page.

In yet another alternative the locally stored content may be a commercial work such as a copyrighted work or other work that requires a payment in order to view and/or manipulate. A second user may receive the commercial work from a locally stored device (using the methods and systems described herein) and the cloud server may track the transfer of the work and/or the viewing or use of the commercial work in order to charge and/or receive compensation for the viewing and/or the transfer.

In one embodiment, credentials that identify users allowed to access or view commercial or even private data are stored with the work and can be transferred across multiple local devices within the cloud network.

III. Computer Program Products

Disclosure within the scope of embodiments illustrated herein can also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, several embodiments will be described in the general context of instructions, such as program modules, being executed by computer consoles, computers in network environments. Generally, program modules include routines, programs, objects, components, data structures, etc. that perform particular tasks or implement particular abstract data types. Instructions, associated data structures, and program modules represent examples of the program code means for executing steps of the methods disclosed herein. The particular sequence of such executable instructions or associated data structures represents examples of corresponding acts for implementing the functions described in such steps.

The embodiments illustrated herein may be practiced in network gaming and computing environments with many types of system configurations, including various electronic machines, such as consoles, personal computers, hand-held devices, multi-processor systems, microprocessor-based or programmable consumer electronics, network PCs, mini-computers, mainframe computers, and the like. Several embodiments may also be practiced in distributed gaming and computing environments where tasks are performed by local and remote processing devices that are linked (either by hardwired links, wireless links, or by a combination of hardwired or wireless links) through a communications network. In a distributed computing environment, program modules may be located in both local and remote memory storage devices, for example in reference to a video game machine.

Applicant's co-pending U.S. provisional patent application Ser. No. 61/538,758 is hereby incorporated herein by reference. Any of the foregoing embodiments described above may be used alone or in combination with one another and/or the embodiments disclosed in the references incorporated herein by reference.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed:

1. A computer system for sharing a cloud data file using a social network, comprising:
   a social network system providing a computer implemented social network including a social network server and social network database, the social network including a plurality of social network accounts, each account associated with a particular friend network within the computer implemented social network and having permission to access social network data associated with the accounts of the particular friend network;
   a cloud storage system that includes a cloud network and a cloud server, the cloud network including a plurality of cloud storage accounts, each cloud storage account associated with data files stored on a plurality of local devices, wherein the cloud storage server synchronizes changes in data files between the local devices;
   wherein the social network system provides a selectable link to a particular social network user, the selectable link being associated with a particular data file synchronized between the local devices in the cloud network and wherein upon selection of the link by the social network user, the social network system provides access to the particular data file in the cloud storage system.

2. The system as in claim 1, wherein the selectable link is a selectable icon or text.

3. The system as in claim 1, wherein providing the link in the social network is a permission to transfer the data file in the cloud network system.

4. The system as in claim 1, wherein the link is provided to the particular social network user by another social network user.

5. The system as in claim 1, wherein the particular data file is a photograph or video file and the file is stored on the social network in a lossy format.

6. The system as in claim 5, wherein the data file is stored on the cloud server in a lossless format and the data file is transferred to an additional computing device in a lossless format.

7. The system of claim 1, wherein the particular data file is a word processing document.

8. The system of claim 1, wherein selection of the link by the social network user, causes the particular data file to be transferred to an additional local computing device.

9. The system of claim 8, wherein the particular data file is transferred to the additional local computing device by the cloud storage server.

10. The system of claim 1, wherein each of the cloud storage accounts has a user name and password associated therewith that is used by the cloud storage system to determine access to the data files.

11. The system of claim 10, wherein the user name and password are used by the cloud server to synchronize the data between two or more of the local computing devices.

12. The system of claim 1, wherein access to the link is based on the rules of the social network.

13. The computing system as in claim 1, wherein the cloud storage network includes at least 1,000,000 cloud network user accounts.

14. The system as in claim 1, wherein the particular data file is synced with fewer than 10 computing devices in the cloud network.

15. The system as in claim 1, wherein each of the cloud server accounts includes at least 5 gigabytes of cloud storage.

16. The system of claim 1, wherein, the selectable link is a selectable icon or text;

the link is provided to the particular social network user by another social network user;

selection of the link by the social network user, causes the particular data file to be transferred to an additional local computing device by the cloud server;

each of the cloud storage accounts has a user name and password associated therewith that is used by the cloud storage system to determine access to the data files;

each of the cloud server accounts includes at least 5 gigabytes of cloud storage; and the particular data file is synced with fewer than 10 computing devices in the cloud network.

* * * * *